(12) United States Patent
Robert et al.

(10) Patent No.: US 12,358,003 B2
(45) Date of Patent: Jul. 15, 2025

(54) CABIN AIR FILTER DEVICE AND COMPONENTS

(71) Applicant: HENGST SE, Münster (DE)

(72) Inventors: Stefan Robert, Nordwalde (DE); Andreas Borchard, Coesfeld (DE); Martin Rölver, Havixbeck (DE)

(73) Assignee: HENGST SE (DE)

( * ) Notice: Subject to any disclaimer, the term of this patent is extended or adjusted under 35 U.S.C. 154(b) by 0 days.

(21) Appl. No.: 18/807,286

(22) Filed: Aug. 16, 2024

(65) Prior Publication Data
US 2025/0121380 A1  Apr. 17, 2025

Related U.S. Application Data

(63) Continuation of application No. PCT/EP2023/053664, filed on Feb. 14, 2023.

(30) Foreign Application Priority Data

Feb. 18, 2022 (EP) .................................... 22157505
Jun. 29, 2022 (EP) .................................... 22182008

(51) Int. Cl.
*B03C 3/66* (2006.01)
*B03C 3/82* (2006.01)

(52) U.S. Cl.
CPC .................. *B03C 3/66* (2013.01); *B03C 3/82* (2013.01); *B03C 2201/30* (2013.01)

(58) Field of Classification Search
CPC .. B03C 3/38; B03C 3/155; B03C 3/82; B03C 3/09; B03C 3/12; B03C 3/41; B03C 3/47; B03C 3/66; B03C 2201/30
See application file for complete search history.

(56) References Cited

U.S. PATENT DOCUMENTS 3,438,180 A * 4/1969 Klouda ..................... B03C 3/47
                                                          55/318
3,735,560 A * 5/1973 Wellman .................. B03C 3/38
                                                          96/62
(Continued)

FOREIGN PATENT DOCUMENTS

CN         101010142 A     8/2007
CN         102000468 A     4/2011
(Continued)

OTHER PUBLICATIONS

European Patent Office, Extended Search Report, Application No. 22157505.3, Aug. 22, 2022, 10 pages.
(Continued)

*Primary Examiner* — Jennifer Dieterle
*Assistant Examiner* — Sonji Turner
(74) *Attorney, Agent, or Firm* — Quarles & Brady LLP; Yakov S. Sidorin (57) ABSTRACT

A gas cleaning device including a filter cartridge with a filter medium and a first filter terminal, a duct with a filter support that removably supports the filter cartridge in a volume of the duct in between the gas inlet and the gas outlet of the duct, and a gas ionizer that provides enhanced intrinsic safety against malfunction, ozone release and electric shocks of maintenance personnel. When the filter cartridge is inserted into the filter support, the first duct terminal contacts the first filter terminal and the first ionizer terminal is electrically connected with the first duct terminal via the first filter terminal. If the filter cartridge is removed from the filter support, the electrical connection between the gas ionizer and the duct terminal is interrupted.

17 Claims, 6 Drawing Sheets

(56) References Cited

U.S. PATENT DOCUMENTS

| | | | | |
|---|---|---|---|---|
| 4,509,958 | A * | 4/1985 | Masuda | B01D 46/521 96/60 |
| 7,112,238 | B2 * | 9/2006 | Joannou | B03C 3/60 96/66 |
| 2005/0109204 | A1 | 5/2005 | Coppom et al. | |
| 2006/0137527 | A1 * | 6/2006 | Joannou | B03C 3/155 96/66 |
| 2007/0199450 | A1 | 8/2007 | Wiser et al. | |
| 2008/0190772 | A1 * | 8/2008 | Greist | B03C 3/155 204/665 |
| 2011/0002814 | A1 * | 1/2011 | Wiser | B03C 3/30 96/17 |
| 2014/0069274 | A1 | 3/2014 | McKinney | |
| 2017/0341087 | A1 | 11/2017 | Yuge et al. | |
| 2019/0160475 | A1 * | 5/2019 | Cwik | B03C 3/41 |

FOREIGN PATENT DOCUMENTS

| | | | | |
|---|---|---|---|---|
| CN | 107413132 | A | | 12/2017 |
| JP | H0691199 | A | | 4/1994 |
| JP | 2006234246 | A | | 9/2006 |
| KR | 20190098616 | A | * | 8/2019 |
| KR | 20200057523 | A | | 5/2020 |
| WO | WO-2020263171 | A1 | * | 12/2020 ............ B03C 3/019 |

OTHER PUBLICATIONS

European Patent Office, Extended Search Report, Application No. 22182008.7, Dec. 23, 2022, 13 pages.

PCT International Search Report and Written Opinion, PCT/EP2023/053664, Apr. 28, 2023, 11 pages.

PCT International Search Report and Written Opinion, PCT/EP2023/053663, May 9, 2023, 12 pages.

* cited by examiner

FIG. 3A: DETAIL C

FIG. 3B: DETAIL D

CABIN AIR FILTER DEVICE AND COMPONENTS

CROSS-REFERENCE TO RELATED APPLICATIONS

This application is a continuation of pending International Application No. PCT/EP2023/053664 filed on Feb. 14, 2023 and now published as WO 2023/156403, which designates the United States and claims priority from the European Patent Applications No. 22157505.3 filed on Feb. 18, 2022 and No. 22182008.7 filed on Jun. 29, 2022. The disclosure of each of these patent documents is incorporated herein by reference.

BACKGROUND

1. Field of the Invention

The invention relates to passenger cabin air filters systems, or more generally to a gas cleaning device including a filter cartridge with a filter medium and at least a first filter terminal for providing an electrical contact to first duct terminal of a duct. The duct may further include a duct wall enclosing a duct volume with an upstream gas inlet and a downstream gas outlet, as well as a filter support. The filter support may removably support the filter cartridge in the duct volume in between of the gas inlet and the gas outlet. The gas cleaning device may further include a gas ionizer for ionizing at least a portion of a gas stream through the duct. The gas ionizer may include at least a first ionizer electrode and a second ionizer electrode, a first ionizer terminal and a second ionizer terminal. The first ionizer terminal may be electrically connected to the first electrode and the second ionizer terminal is electrically connected to the second electrode.

2. Description of Related Art

Passenger cabin air filters systems remove pollutants from the ambient air and provide the cleaned air to the interior of a passenger cabin of a vehicle. Essentially the same technology may be used in other fields, e.g., for building ventilation.

Usually "filtration" references to removal of particulate matter from a gas stream by a sieving the gas stream using fibrous filter—the sieve. Cleaning the air based on sieving alone requires balancing between the size of the smallest particles to be held back in the sieve and the pressure drop of the sieving element—the fibrous filter medium. Removing particulate matter from a gas stream by filtration appears to be a result of a number of effects including interception, diffusion, inertial impaction. It has been suggested to improve particle removal from a gas stream using electrostatic forces by means of electret filters. The particle removal of these electret filters, however, appears to fade with in-creasing deposition of the fibers with particles. To address this drawback, it has been suggested to apply an external electrical field across the filter medium by locating the filter medium as a dielectric medium between two air permeable electrodes. Even non-charged submicron sized particles can be effectively re-moved from the gas stream using this technique. This technique referred to as active field polarized media air cleaning, which is to be distinguished from electrostatic precipitation and passive electrostatic filters (electret filters).

These active field polarized media gas cleaners usually have a gas filter housing with a receptacle for a gas filter and a high-voltage (HV) source being connected to the electrodes of the gas filter. Once the service life of the gas filter is reached it is removed from the housing and replaced by another one. The housing hence has at least two electrical contacts for removably contacting corresponding electrical contacts of the gas filter, thereby enabling to provide an electrical connection of the gas filter with the HV-source.

US 2007/0199450 A1 suggest an air filter having two air permeable ground electrodes and an air permeable HV electrode in between of these. Between each ground electrode and the HV electrode is a dielectric filter medium. The HV-field between the electrodes polarizes both, the particles as well as the fibers of the dielectric.

While these active field polarized media air cleaners allow to efficiently remove even sub-micron particles, air-ionization enables to sterilize air as well as to re-move odors on a molecular scale. Air-ionization requires, depending on the distance of the electrode about 5 kV and typically-depending on the size of the air-ionizer—a current of a few 10 $\mu$A to 10 mA. Corona discharge air cleaners are an example of air-ionizers. Industry scale gas ionizer may have correspondingly larger currents.

WO2020/263171A1 suggests using a conductive filter medium of a filter cartridge as an electrode of a gas ionizer. Attached to the upstream side of the filter element are a number of isolating supports for emitter electrodes having tips pointing in the upstream direction. About 7-10 kV are provided to the emitter electrodes, while the filter medium is grounded. The voltage between the filter medium and the emitter electrodes results in a corona discharge which contributes to particle removal from a gas flow though the filter element. A power sup-ply is directly attached to the filter cartridge and is removed with the filter cartridge when replacing the filter cartridge. The power supply may then be re-moved from the used filter cartridge and may be attached mechanically to a support structure of the new filter cartridge. Further, the output terminals of the power supply are to be connected via a cable with the emitter electrodes of the gas ionizer. The ground electrode is embedded in the center of the filter medium and may be e.g., an activated charcoal layer of the filter medium or a layer of carbon fibers. This ground electrode layer is contacted by pinching a needle through the plied filter medium. The needle is connected by a wire with the ground connector of the power source.

US2019/160475A1 suggest an electrostatic air filter having a reduced ozone and nitrogen oxide emission. The electrostatic air filter includes an air flow channel with an inlet having an ion generator including corona electrodes and cumulative electrodes. The corona electrodes and the cumulative electrodes are electrically connected to each other, while the cumulative electrodes are insulated from the corona electrodes, so that corona discharge occurs between the corona electrodes and the cumulative electrodes. The corona discharge causes ionization of contaminant particles present in the air flowing through the channel. Contaminant particles are separated downstream with an input electrode and an output electrode. The air flows through the two electrodes to the channel outlet. The electric field strength in the space between the input electrode and the out-put electrode is directed opposite to the electric field strength in the space be-tween the ion generator and the input electrode.

KR 2020/0057523 addresses the problem of sparking in electric filters by suggesting an ionization unit including a discharge electrode to which a positive voltage is applied and a facing electrode plate to which a negative voltage is applied. Dust is ionized by these electrodes and collected by a dust collecting unit with a positive electrode plate disposed on the rear side of the ionization unit and a negative electrode plate configured to collect the dust ionized while passing through the ionization unit. The positive electrode plate and the negative electrode plate are alternately stacked while being vertically spaced from each other. The electrode plates include a metal plate and an insulation layer for protecting the electrode plates from contact with moisture.

JP H06 91199A relates to an electro-osmic dehydration method of sludge in which the sludge is heated prior to electro-osmotic dehydration.

SUMMARY OF THE INVENTION

The embodiments are providing a solution to the problem of reducing waste, to ease used filter recycling and to increase operational safety of a gas cleaning device with a gas ionizer.

For example, a solution may be a cabin air cleaner or more generally a gas cleaning device as well as its components, be it in combination or as such. The gas cleaning device may include an optional filter cartridge. The filter cartridge may have a filter medium and at least a first filter terminal and/or a second filter terminal. Each of the filter terminals may be used to connect the filter cartridge to a power source. To connect in this context means as usual to provide an electrical connection between the filter terminals and the corresponding connectors of the power source.

The filter medium may preferably include a capacitor with at least a first filter electrode and a second filter electrode. At least one of the filter electrodes may be electrically connected to a corresponding filter terminal. A dielectric medium may be located in between of the first filter electrode and the second filter electrode. For example, the first filter terminal may be electrically connected ("connected" for short) to the first filter electrode and/or the second filter terminal may be connected to the second filter electrode. Via the first filter terminal and/or the second filter terminal the filter electrodes may be connected to a power source, but other means to connect the first electrode and/or the second electrode to an output port of the power source may be used as well.

As usual, the at least one filter medium is permeable for a fluid (e.g., a gas, in particular air), but not for particles above a given particle size. Thus, the filter medium can be considered as a sieve.

The gas cleaning device may further include a duct. The duct may be defined by and/or include a duct wall. The duct wall may enclose a duct volume with an upstream gas inlet and a downstream gas outlet. Thus, as usual a gas stream to be cleaned may enter the gas inlet flow, through the duct and leave the duct via the gas outlet. The gas inlet can thus be considered as an upstream end and the gas outlet can be considered as a downstream end of the duct.

The duct may further include a filter support, wherein the filter support is configured to removably support the filter cartridge in the duct volume in between of the gas inlet and the gas outlet in an operation position. The position in which the filter cartridge is supported by the filter support, is as usually considered as the inserted position. Any other position may be referred to as a non-inserted position.

In other words, in the inserted position, gas flowing from the gas inlet passes the filter medium prior to leaving the duct via the gas outlet. For example, the filter support can be a tray configured to receive the filter cartridge and maintain it in the position in between of the gas inlet and the gas outlet during normal operation of the gas cleaning device.

Removably means that the filter cartridge is movable from an "inserted position" which can as well be referred to as the operating position to a removed, i.e. a so called "non-inserted" position. In other words, the filter cartridge may be configured to be moved between the inserted position and the non-inserted position. In the non-inserted position, the filter cartridge may but does not need to be supported by the filter support.

Generally, one may assume, that in the inserted position gas flowing through the duct passes the filter cartridge's filter medium, preferably, the entire gas flow passes the filter medium. However, in some applications a bypassing gas flow can be accepted and/or not avoided and/or may even be required. In other words, in the inserted position, the filter cartridge may be configured to provide a first percentage of a given gas flow through the duct through the filter element of the filter cartridge, whereas in the non-inserted position the filter cartridge is configured to filter none or only a reduced second portion of the gas flow through the duct. The second portion being filtered corresponds hence to a lower percentage than the first percentage. Lower percentage may for example mean a significantly lower percentage, which can be considered as equal or less than 50% of the first gas flow. In an example the filter cartridge is fully removed from the duct, in case it is in its non-inserted position.

The duct may further include a first duct terminal and/or a second duct terminal. In case a filter cartridge is inserted into the filter support, the first duct terminal may contact the first filter terminal (here, the first duct terminal and the first filter terminal are first respectively corresponding mating terminals) and/or the second duct terminal may contact the second filter terminal (here, the second duct terminal and the second filter terminal are second respectively corresponding mating terminals). Thus, a voltage can be provided to the filter cartridge via at least one of the filter terminals. Only to avoid ambiguities, "is inserted" describes a state in which the insertion of the filter cartridge into the filter support is completed. One could as well say, that in case a filter cartridge has been inserted into the filter support, the first duct terminal may contact the first filter terminal and/or the second duct terminal may contact the second filter terminal. If the filter has been removed, i.e. the filter cartridge is not inserted, the first duct terminal may not contact the first filter terminal and/or the second duct terminal may not contact the second filter terminal. Thus, in the state of non-insertion of the filter cartridge in the filter support, i.e., in the state of removal, the first duct terminal is electrically disconnected from the first filter terminal and/or the second duct terminal is electrically disconnected from the second filter terminal.

The gas cleaning device may further include a gas ionizer. The gas ionizer may include at least a first ionizer electrode and a second ionizer electrode, a first ionizer terminal and a second ionizer terminal, wherein first ionizer terminal may be electrically connected to the first electrode and the second ionizer terminal may be electrically connected to the second electrode. Thus, by applying a corresponding voltage to the first ionizer terminal and/or the second ionizer terminal, a corona discharge can be observed. Such corona discharge occurs, if the electrical field in the vicinity of an ionizer electrode exceeds the dialectical strength of the fluid (e.g., a gas) gas in the duct volume, which fluid may preferably be air. Typical voltages for air cleaning by corona discharge are in the range of a couple kV (e.g., 2 to 12 kV, typical 3 to 7 kV) depending on the design of the ionizer electrodes.

Corona discharge in air produces Ozone ($O_3$). However, $O_3$ is considered to cause irritations of mucous and respiratory tissues of passengers in the passenger cabin. Accordingly, the ionizer electrodes are preferably upstream of the filter cartridge, as by this sequencing of the ionizer electrodes and the filter cartridge $O_3$ is at least mostly converted to $O_2$ when passing the filter medium. For example, if activated charcoal and/or a polymer and/or carbon fibers are/is included in the filter medium, the $O_3$ concentration in the air flow is significantly reduced while passing the filter cartridge.

The gas ionizer may be located upstream of the filter element. For example gas ionizer may be supported in the duct, as well. In another example, the gas ionizer may be located in or define a separate conduit, which separate conduit may be in fluid communication with the upstream facing side of the filter element. Only for simplicity, herein we assume that such separate conduit and optional valves for controlling the gas flow are a part of the duct.

The duct may as well mechanically support the gas ionizer. Alternatively, gas ionizer may be supported by other components. For example, the gas ionizer may be supported by brackets, that may e.g. extend via at least one hole of the duct and which may themselves be supported by a support structure, such as, e.g., a base, a chassis, a flooring, a ceiling, a wall, a door leaf, or the like. For the operation of the gas cleaning device the way of attachment is not important and it may be adapted as suited best by the corresponding use or location of use of the gas cleaning device.

Preferably, the filter cartridge, if inserted in the filter support, provides for an electrical connection between the first duct terminal and the first ionizer terminal and/or for an electrical connection between the second duct terminal and the second ionizer terminal. Thus, if the filter cartridge is removed, gas ionizer is disconnected from the power source. As apparent, the at least two ports or connectors of the power source may be connected to the first duct terminal and/or the second duct terminal. In an example, the at least one, preferably two power source ports (terminal) is/are provided by each by one or more duct terminal(s).

The first electrical connection may be provided by a first filter conductor of the filter cartridge contacting the first duct terminal and the first ionizer terminal. In this sense, if the filter cartridge has been inserted the first ionizer terminal may be contacted via the first filter terminal with the first duct terminal. The wording "via the first filter terminal" shall not exclude additional means of conduction in the electrical path between the first filter terminal and the first ionizer terminal. For example, the first ionizer terminal may contact a contact surface of any conducting element being electrically connected with the first filter terminal. The conducting element being contacted may be a part of the filter cartridge and/or a part of the duct or of any other element of the gas cleaning device, provided the first filter terminal is connected in series in between the first duct terminal and the first ionizer terminal and thus the first ionizer electrode.

The second electrical connection may be provided by a second filter conductor of the filter cartridge contacting the second duct terminal and the second ionizer terminal. In this sense, if the filter cartridge has been inserted the second ionizer terminal may be contacted via the first filter terminal with the first duct terminal. The wording "via the second filter terminal" shall not exclude additional means of conduction in the electrical path between the second filter terminal and the second ionizer terminal. For example, the second ionizer terminal may contact a second contact surface of second conductor being electrically connected with the second filter terminal. The conducting element being contacted by the second ionizer terminal may be a part of the filter cartridge and/or a part of the duct or of any other element of the gas cleaning device, provided the second filter terminal is connected in series in between the second duct terminal and the second ionizer terminal and thus the second ionizer electrode.

In both cases, removing the filter cartridge interrupts the connection of the duct terminal(s) with their corresponding ionizer terminal. The risk of unintendedly releasing $O_3$ via the duct gas outlet, e.g., into a passenger cabin of a vehicle or a bureau or living room or any other volume where humans or animals may be present is thus mitigated, as the electrical connection between the gas ionizer and the power source is interrupted is the filter is removed. Only to clarify, to ensure the function of interrupting the current through the ionizer, it is sufficient if one of the first ionizer terminal and the second ionizer terminal is electrically connected via the corresponding filter terminal with the corresponding duct terminal. The respective other ionizer terminal may be connected directly to the corresponding port of the high voltage source, where "directly" means in this sentence in any way that does not include the corresponding filter terminal.

In an example, the first duct terminal contacts the first filter terminal (that is, the first respectively corresponding mating terminals are in contact with one another). Further, it the first ionizer terminal may be electrically connected with the first duct terminal via the first filter terminal. For example, the first duct terminal may contact the first filter terminal while the first ionizer terminal contacts the first filter terminal. Similarly, the second duct terminal may contact the second filter terminal (in which case the second respectively corresponding mating terminals are in contact with one another) and the second ionizer terminal is electrically connected with the second duct terminal via the second filter terminal. Removing the filter cartridge automatically disconnects at least one of the first and second ionizer terminals from the power source.

If the first duct terminal contacts the first filter terminal while (i.e., only when) the first ionizer terminal may contact the first filter terminal and/or if the second duct terminal contacts the second filter terminal the second ionizer terminal may contact the second filter terminal. In any of the three possibilities, the voltage drop across the filter cartridge is reduced. This contributes directly to lower operating costs as well as to lower installation costs, as the high voltage source being connected to the first duct terminal and/or the second duct terminal for providing the electrical power to the gas ionizer can be dimensioned accordingly smaller.

For example, a first surface section of the first filter terminal may electrically contact the first duct terminal and a second surface section of the first filter terminal my electrically contact the first ionizer terminal. Similarly, a first surface section of the second filter terminal may electrically contact the second duct terminal and a second surface section of the second filter terminal may electrically contacts the second ionizer terminal.

In any of the above sketched examples, removing the filter cartridge from the filter support provides a situation in which the first duct terminal does not contact the first filter terminal and accordingly the first ionizer terminal is electrically disconnected from at least the first duct terminal and/or in which the second duct terminal does not contact the second filter terminal and accordingly the second ionizer terminal is electrically disconnected from at least the second duct terminal.

As already sketched above, the filter cartridge may further include a first polarization electrode, a second polarization electrode and a second filter terminal, wherein the first filter terminal is electrically connected with the first polarization electrode and the second filter terminal is electrically connected with the second polarization electrode. If the filter cartridge is inserted in the filter support, the second filter terminal preferably contacts the second duct terminal.

The second filter terminal as well as the second duct terminal can be omitted, e.g., by providing a direct connection of the second polarization electrode with a corresponding port (e.g. a ground terminal) of the power source.

In an example, the first filter terminal may be electrically connected via a first resistive component (that has a first resistance) to a branching point. Further, the second filter terminal may be electrically connected via a second resistive component (that has a second resistance) to the same branching point. (The terms resistor and resistive component are used herein interchangeably.) The first polarizing electrode may be electrically connected to the branching point as well, and the second polarizing electrode may be electrically connected to the second filter terminal. This allows to adjust the voltage across the polarization electrodes by adjusting the ratio of the first and the second resistances and hence to adapt them to the dimensions and the material of the filter medium in between of the filter electrodes. Thus, the polarization voltage can be adjusted to a particular filter medium, without any necessity to adjust the voltage being provided by the power source via at least the first duct terminal. This allows to adjust e.g., the filter medium to different environmental conditions. For example, in a humid climate one may want to use a different filter than in dry and dusty climates. This change of the filter layout may require a change of the polarization voltage, which can be obtained by simply adjusting the first and the second resistors, which may be included in or by the filter cartridge. Further, a single high voltage power source providing a single voltage can be used to power the gas ionizer as well as the gas polarizer.

For example, the first filter terminal and/or the second filter terminal may include a conducting polymer and/or a conducting ceramic and/or a conducting compound, or in a specific implementation may be made of or consist of such conducting polymer and/or conducting ceramic and/or conducting compound. The resistors and connections between the first filter terminal and the first polarizing electrode and/or the second filter terminal may be made of the same material. These materials are not considered to be electroscrap and can thus be recycled or deposited like usual garbage. If the terminals, resistors or the like would be typical electronic parts, being e.g., mounted to a printed circuit board, more resources would be required, and recycling would be more difficult and this expensive.

As already apparent, the first filter terminal and/or the first resistor and/or the second filter terminal and/or the second resistor and/or the branching point may be unitary. These parts may be manufactured as single piece that may be attached to a support structure of the filter cartridge. For example, this single piece may be attached to a side wall of the filter cartridge. For example, the optional side wall of the filter cartridge may define at least one narrow facing side of the filter cartridge and may be configured to close a gap between the duct wall and the filter cartridge.

The first filter terminal and/or the second filter terminal may have at least a first sprue and/or a second sprue. The first sprue may contact the first duct terminal and/or the second sprue may contact the second duct terminal. This allows to reduce the contact resistance between the mutually contacting terminals, as conducting polymers and/or a conducting ceramic and/or a conducting compound often show a reduced resistivity in their core compared to the resistivity in the outer regions (i.e., in the vicinity of the 'normal' shell surface). At the sprue location, the core reaches the shell surface and is hence contactable, i.e., in this area the contact resistivity is reduced.

In addition or alternatively, the first duct terminal and/or the second duct terminal and/or the first ionizer terminal first and/or the second ionizer terminal are/is a blade being inserted into the first filter terminal and/or the second filter terminal, respectively. The blade may thus cut through the outer layer of the first filter terminal and/or of the second filter terminal and thereby contact a core section of the terminal. Such contact is particularly safe and reliable and provides a particularly low contact resistance.

In an example, at least one of the first filter terminal, the second filter terminal, the first duct terminal and the second duct terminal is and/or includes an electrically conducting pin, and such pin is contacted by (that is, is in contact with) the respectively corresponding mating terminal (that is, with the respective corresponding other entity). The electrically conducting pin may be accommodated by a first recess or a second recess, respectively, of the duct or the filter terminal, respectively, and the recess may optionally be delimited by a non-conducting recess wall. The corresponding terminal of the other entity may contact the pin inside of the recess. To make it more vivid, if the pin is the first filter terminal, it may be referred to as first filter pin. In this case, the recess may be formed by the duct, e.g., by the duct wall and/or it may be a part of the filter support. The first filter terminal may thus engage into the recess at least with a distal portion of the first filter pin and while being engaged, the first filter pin may contact the first duct terminal. The recess wall may thus mechanically support the first filter pin and/or provide a shock-proof protection of the duct terminal in case the filter cartridge is deinstalled, e.g., during maintenance. The first ionizer terminal may preferably contact a proximal portion of the first filter pin. In case the electrically conducting pin is the second filter terminal, one simply has to replace first by second in the previous five sentences. Proximal means a portion of the pin being closer to the filter medium that the end of the pin that contacts the corresponding duct terminal.

As apparent the from the above, the electrically connecting pin may be included by the filter cartridge and may be contacted inside the recess by the first duct terminal. In this case the distance between the first duct terminal and the first ionizer terminal and/or the distance between the first duct terminal and a filter cartridge facing edge of the recess wall may be greater than the distance between the first ionizer electrode and the second ionizer electrode. Each of these measures increases intrinsic safety: By these choices of the distances, it can be avoided that sparking between the first ionizer terminal and the first duct terminal occurs, if the filter cartridge is not installed and for any reason (e.g., a defective switch, a software error, . . . ) the power source is not switched off as it should be. Further, the risk of an electrical shock of maintenance personnel replacing a filter cartridge is reduced.

The gas cleaning device may include a power source, as well referred to as high voltage source, herein. The high voltage source has a first source terminal and a second source terminal. The high voltage source may have a voltage source housing. The voltage source housing may be attached to and/or at least in part integrated in the duct. For example, a portion of the duct wall may as well be a part of the power source housing and/or the power source housing may be attached to the duct wall. A first source terminal may be electrically connected to and/or identical with the first duct terminal and optionally a second source terminal may be electrically connected to the second duct terminal and/or be identical with the second duct terminal. For example, the first duct terminal may be connected to a high voltage output terminal (i.e., the first source terminal) of the power source and the second duct terminal may be connected to a ground terminal (i.e., the second source terminal) of the power source or vice versa. The power source and/or the duct may have additional terminals. None of these terminals is necessarily a ground terminal, but at least one of these may be.

Another solution of the above sketched problems is provided by a method for connecting (and/or disconnecting) a first ionizer terminal of a gas ionizer to a first duct terminal of a gas duct of a gas cleaning device, wherein a first filter terminal is electrically connected (and/or disconnected) to the duct terminal and at the same time connected (and/or disconnected) to the first ionizer terminal. Preferably said connecting and disconnecting is obtained by contacting and releasing the previously provided contact, respectively.

The method can for example be performed by assembling the gas cleaning device as described above and/or in the figures by electrically connecting the first filter terminal to the first duct terminal by inserting the filter cartridge into the filter support and disconnecting by removing the filter cartridge from the filter support.

Only to avoid any confusion it is recalled that the term "terminal", as usual, denotes a point, in practice piece with a contact surface, at which a conductor from a component, device or network comes to an end (see e.g. en.wikipedia.org/wiki/Terminal_(electronics), dated May 19, 2022). In an alternative, one may say that a terminal is an electrical contact. Examples for a terminal are a male pin type connectors and/or a corresponding female sleeve type connectors and/or a simple contact pad.

Herein contacting two pieces means to provide an electrical contact between these two pieces by bringing them in direct contact. A connection in is an electrical connection, i.e., two electrically conducting pieces that are connected are contacted with each other indirectly or directly. An indirect connection may be provided e.g., by an electrical conductor that contacts both pieces. In case of a direct connection the two electrically conducting pieces contact each other.

Herein, a conductor is an electrical conductor (e.g., a metal), it may of course have a resistivity. A conductor distinguishes from an isolator in that an isolator has a band gap $\Delta E$ between the fermi energy $E_f$ and the conduction band, wherein the band gap is greater than the $k_\beta T$ ($\Delta E \gg k_\beta T$), T is the operating temperature and $k_\beta$ the Boltzman constant. Semiconductors ($\Delta E \approx k_{\beta T}$) shall be considered as conductors. In short, during normal operation, a conductor is electrically conducting, and an isolator is not.

Herein, the term conductive polymer and/or conductive ceramics encompasses not only polymers and/or ceramics being conductors or semiconductors, but as well compound materials based on a matrix of non-conducting polymers and/or non-conducting ceramic materials into which a conductive material, e.g., metal fibers and/or carbon fibers and/or graphite or the like have been integrated. The conducting compound hence may have a non-conductive matrix into which conductive fibers have been embedded and the conductivity of the compound can hence be attributed to the conductive fibers (which may as well be filaments, particles, beads or the like), being for example randomly distributed in the matrix. Of course, non-conducting fibers may as well be embedded in a conducing matrix. In both cases, the compound material is able to conduct a current. As is implicit from the above, the terms conducting and non-conducting refer to electrical conductivity, not to thermal conductivity.

BRIEF DESCRIPTION OF THE DRAWINGS

In the following, the invention is described by way of example, without limitation of the general inventive concept, on examples of embodiment and with reference to the drawings.

Generally, the drawings are not to scale. Like elements and components are referred to by like labels and numerals. For the simplicity of illustrations, not all elements and components depicted and labeled in one drawing are necessarily labels in another drawing even if these elements and components appear in such other drawing.

While various modifications and alternative forms, of implementation of the idea of the invention are within the scope of the invention, specific embodiments thereof are shown by way of example in the drawings and are described below in detail. It should be understood, however, that the drawings and related detailed description are not intended to limit the implementation of the idea of the invention to the particular form disclosed in this application, but on the contrary, the intention is to cover all modifications, equivalents and alternatives falling within the spirit and scope of the present invention as defined by the appended claims.

DETAILED DESCRIPTION

Figure 1:
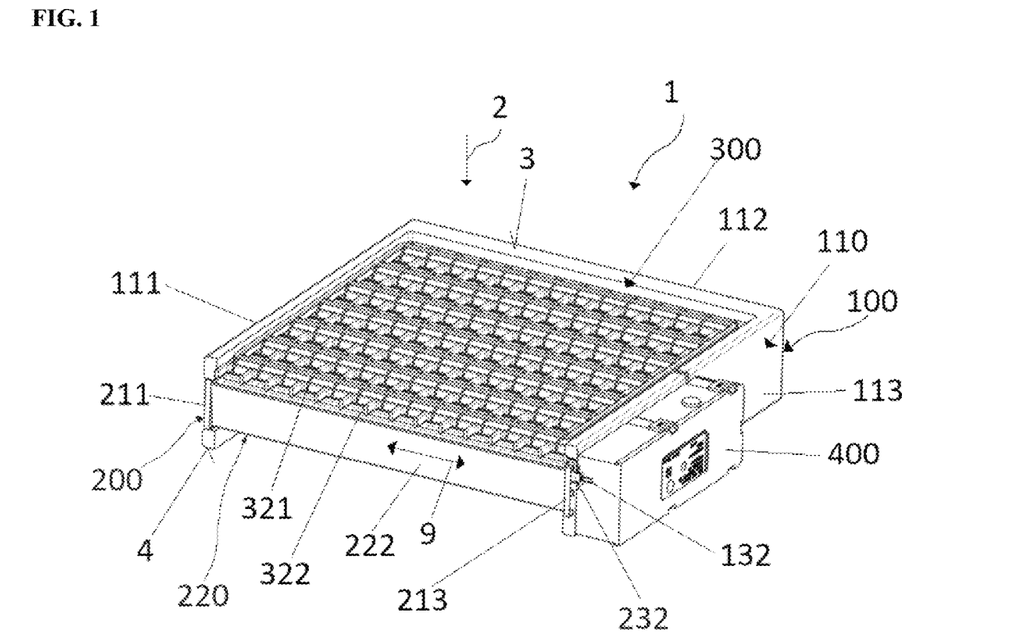
FIG. 1 shows a perspective sectional view of a gas filter device.

FIG. 1 illustrates an example gas cleaning device 1 in perspective sectional view. The gas cleaning device 1 has a duct 100 with a duct wall 110. Only as an example, the duct wall 110 may include a front wall 111, a rear wall 113 and two side walls 112. One of the two side walls 112 has been removed in FIG. 1 for illustrative purposes, only. The duct wall 110 has an upstream facing end surface 3 and a downstream facing end surface 4. The inner rim of the upstream facing end surface 3 delimits an inlet gas opening and the inner rim of the downstream facing end surface 4 delimits an outlet gas opening.

The duct 100 may include or form a filter support that may accommodate a filter cartridge 200. The filter cartridge 200 has a filter medium 220. Preferably, the filter medium 220 is a part of a capacitor or may even form a capacitor. For example, the filter medium 220 may include a first polarizing electrode 221 and a second polarizing electrode 222. In between of these two polarizing electrodes 221,222 may be a dielectric medium 223 (see FIG. 6). The first polarizing electrodes 221 may be a first filter layer 221 and the second polarizing electrode 222 may be a second filter layer 222.

Figure 2:
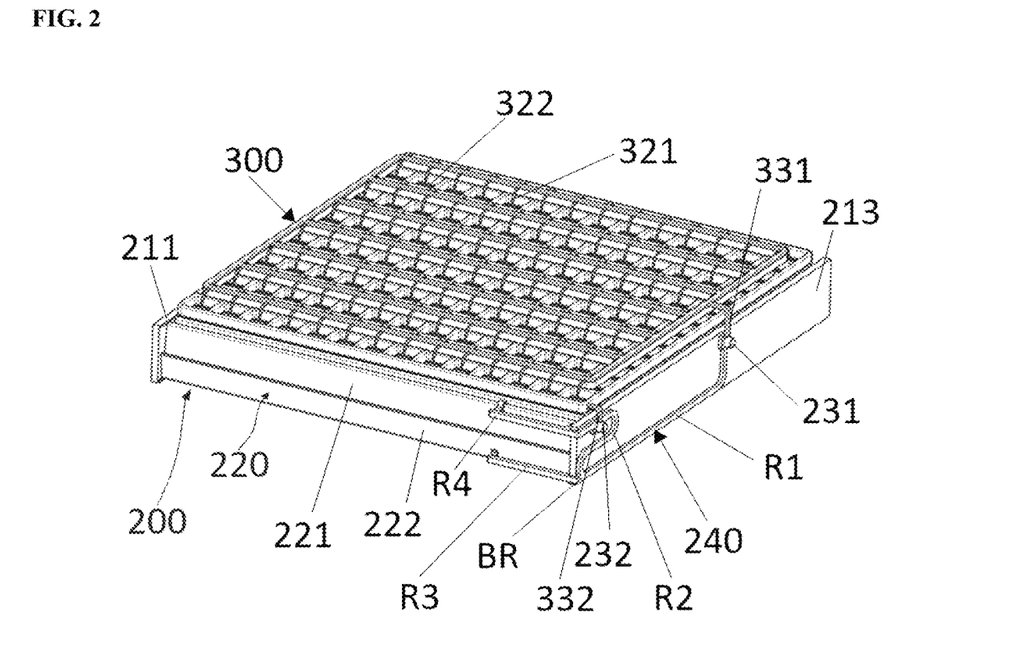
FIG. 2 shows a gas filter cartridge and a gas ionizer of the gas filter device of FIG. 1.

As can be seen in FIG. 2, the filter cartridge 200 may include an electrical module 240. The electrical module 240 may be made of or include a conductive polymer string and/or a conducting ceramic string and/or a conducting compound is attached to a filter cartridge 200. Preferably, the electrical module 240 is a unitary piece. The filter cartridge 200 may further include a first filter terminal 231 being connected with the first filter layer 221 and a second filter terminal 232 being connected with the second filter layer 222. As depicted, the electrical module 240 may include the first terminal 231 and the second filter terminal 232 and may as well include conductors connecting the first filter terminal 231 with the first filter layer 221 and the second filter terminal 232 with the second filter layer 222. Preferably, the first filter terminal 231 is connected via a first portion of the electrical module 240 (a first resistor R1) with a branching point BR. Further, the branching point BR may preferably be connected via a second portion R2 of the electrical module 241 with the second filter terminal 232. The branching point BR may be further connected via a third portion R3 of the electrical module, i.e., via a third resistor R3 with the first filter layer 221. Further, the second filter terminal 232 may preferably be connected by a fourth portion R4 of the electrical module 240 to the second filter layer 222 as shown (see as well FIG. 6).

Figure 3:
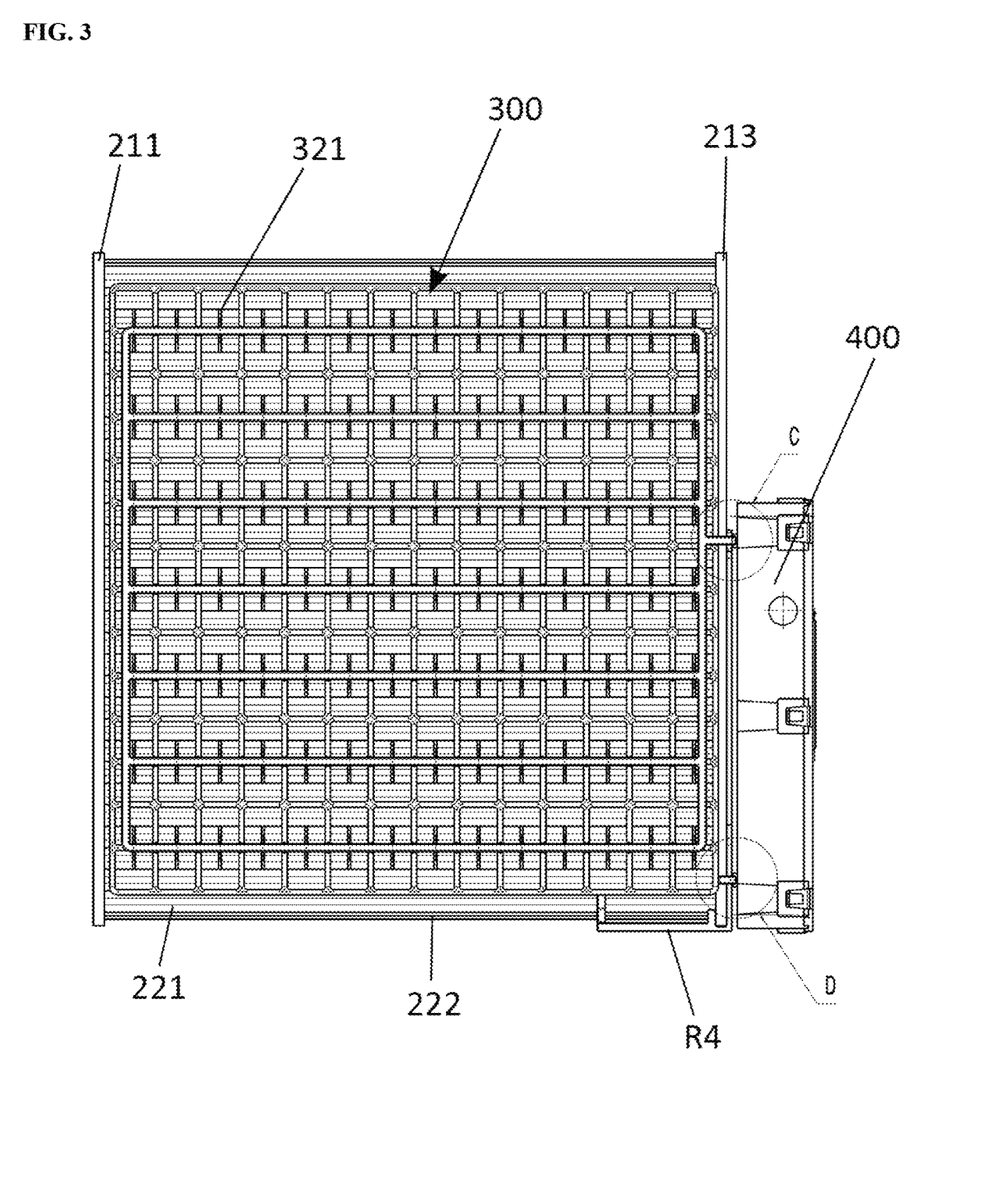
FIG. 3 shows the gas filter cartridge and the gas ionizer of FIG. 1 with a power source in a top view.

Upstream of the filter cartridge 200 may be a gas ionizer 300 (see FIGS. 1 to 3). The gas ionizer 300 may be supported by the duct 100 as well, but it can of course as well be supported and/or attached to other parts. The gas ionizer 300 may in an example, be supported independently from the filter cartridge 200, but again it is noted that this independence is not required, although it simplifies maintenance. Supported independently means in this context that if the filter cartridge 200 is removed, e.g., shifted out of the support (tray), the gas ionizer 300 may stay in place.

The gas ionizer 300 may have one or more first ionizer electrodes 321 (regardless of the number, briefly: first ionizer electrodes 321) and one or more second ionizer electrodes 322 (regardless of the number, briefly: second ionizer electrodes 322). The first ionizer electrodes 321 may be electrically connected via a conductor with a first ionizer terminal 331. Similarly, the second ionizer electrodes 322 may be electrically connected via a conductor with a second ionizer terminal 332. As can be seen, i.e., in FIG. 2, the first ionizer terminal 331 may preferably contact directly the first filter terminal 231 and/or the second ionizer terminal 332 may preferably contact directly the second filter terminal 232. As can be seen in this example, the at least one, preferably both ionizer terminals 331, 332 may preferably contact a peripheral surface of the corresponding filter terminal 231, 232, preferably directly. As shown in the depicted examples, at least one (shown: both) of the first filter terminal 231 and the second filter terminal 232 may be first and second pins 231, 232 with longitudinal axes 2311, 2322 that extend parallel to the direction of movement when inserting or removing the filter cartridge 200 into or out of, respectively, the duct 100. In this example the direction of movement is indicated by a double headed arrow 9 (see FIG. 1). Only to rephrase it, the first and the second filter terminals 231, 232 may have the shape of first and a second pin 231, 232.

As can be seen best in FIG. 2, the filter cartridge 200 may have a front filter medium support 211 and/or a rear filter medium support 213. The electrical module 240 may be attached at least in part to the front filter medium support 211 and/or the rear filter medium support 213. The front filter medium support 211 and/or a rear filter medium support 213 are preferably made of in isolating material like. e.g., cardboard, wood, isolating plastics, etc.

Further, the gas cleaning device 1 may include a power source 400 (see FIGS. 1 and 3). The power source 400 may provide a high voltage (for example 5 kV, more generally 3 to 7 kV even more generally 1-10 kV, depending on the distance of the ionizer electrodes) to a pair of duct terminals 131, 132, which are visible in FIGS. 1, 4 and 5, respectively. As will be explained in more detail below, the first ionizer terminal 331 may be connected by and/or via the first filter terminal 212 with the first duct terminal 121 and hence to the power source 400. Similarly, the second ionizer terminal 332 may be connected by and/or via the second filter terminal 222 with the second duct terminal 122. Thus, if one removes the filter cartridge 200 from the duct, the gas ionizer 300 is disconnected from the power source 400 and it is avoided that $O_3$ can be produced that would enter a passenger cabin if no filter cartridge were installed.

Figure 3A:
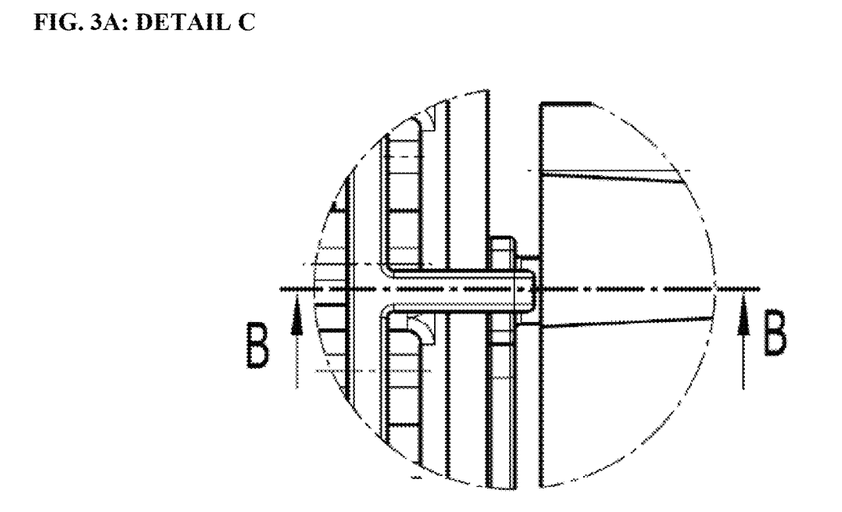
FIG. 3A shows detail C of FIG. 3.
Figure 3B:
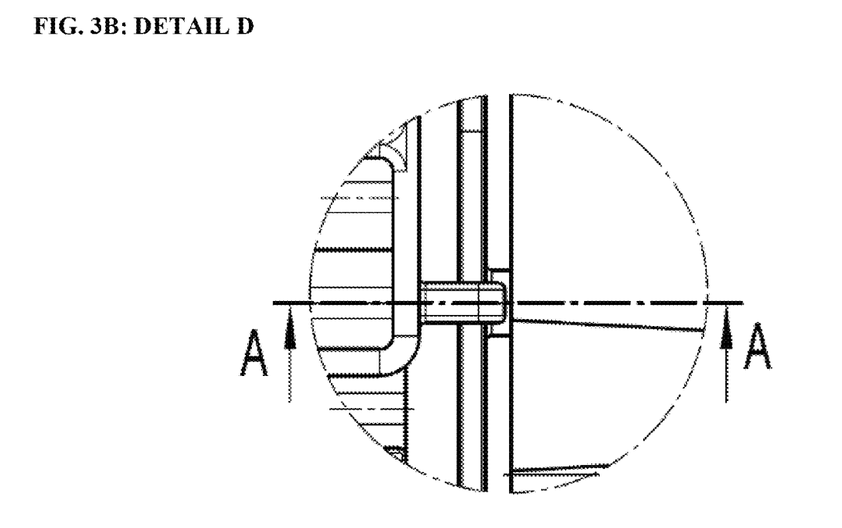
FIG. 3B shows detail D of FIG. 3.

In FIG. 3 a top view (i.e., the viewing direction is parallel with the gas flow direction 2 in FIG. 1) of the filter cartridge 200, the gas ionizer 300 and the power source 400 is shown. The duct walls have been omitted in the FIGS. 4 and 5 for illustrative purposes. In FIGS. 3A and 3B, showing the details C and D of FIG. 3, two sections, namely A-A and B-B are indicated. Section plane A-A extends through the first filter terminal 231 and section plane B-B extends through the second filter terminal 232. The corresponding sectional views are shown in FIGS. 4 and 5, respectively.

Figure 4:
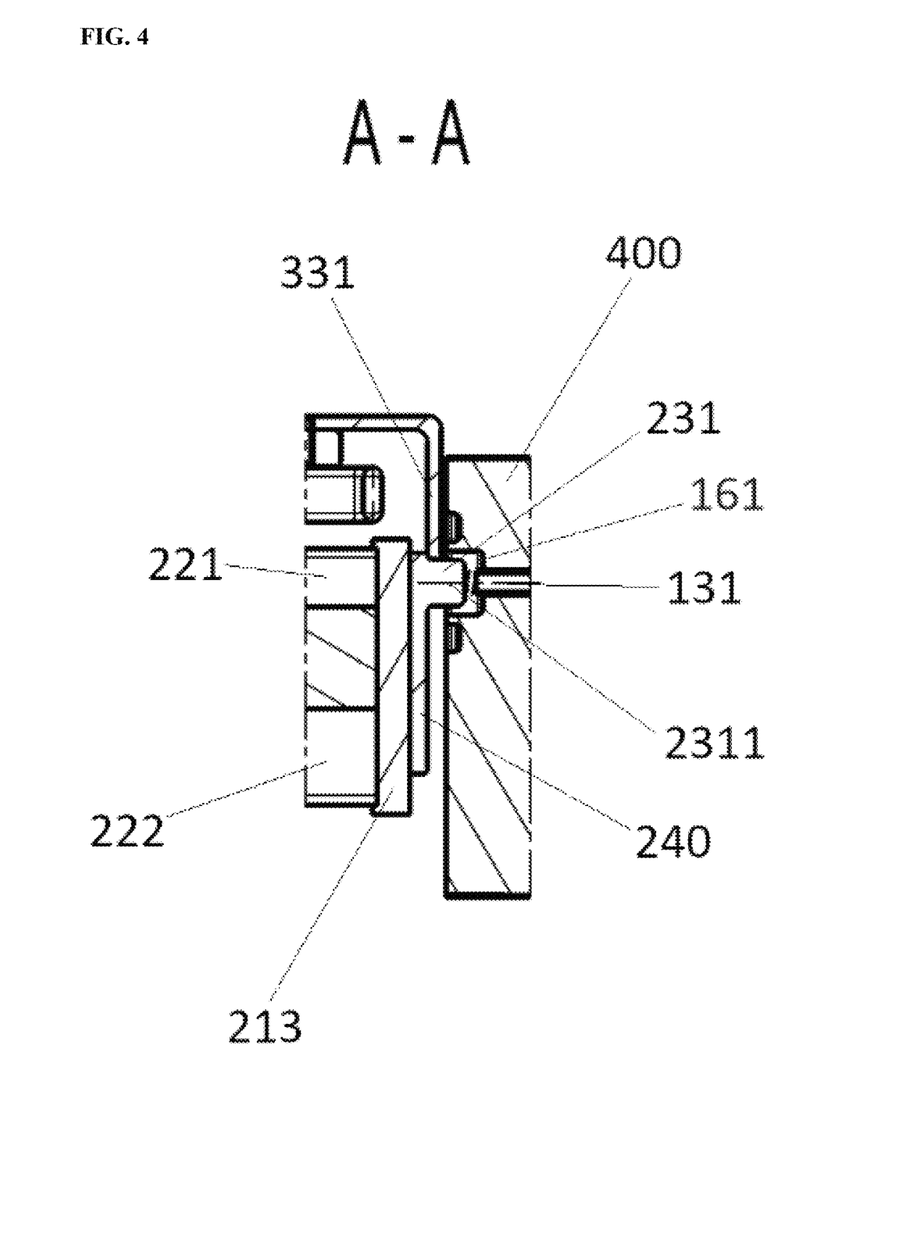
FIG. 4 shows a sectional view along the plane A-A of detail D of FIG. 3B.

As can be seen in FIGS. 2 and 4, the first duct terminal 131 may be a conducting protrusion being located in a first recess 161 (see FIG. 4) of the duct 100. As shown in FIG. 4, the power source housing may provide a portion of the duct wall 110 or may in part be unitary with at least a portion of the duct wall 110. The first recess 161 is delimited by a recess wall and the first duct terminal 131 may protrude through the bottom of the recess wall. In an example, the first duct terminal 131 may include a conducting elastic element, e.g., a spring, that may be compressed if the first filter terminal 131 is inserted into its final location in the first recess 161 to thereby ensure a reliable electric contact between the first duct terminal 131 and the first filter terminal 231. In the final position of the first filter terminal 231, as depicted, the first filter terminal 231 engages into the first recess 161 to thereby contact the duct terminal 131. As can be seen in FIG. 4, the first ionizer terminal 331 may be pressed against the housing wall by a shoulder of the first filter terminal 231. Thereby, the contact between the first filter terminal 231 and the first ionizer terminal 331 is particularly good. In addition or alternatively, at least one of the first ionizer terminal 331 and the first duct terminal 131 may be a blade that cuts into the first filter terminal 231.

Figure 5:
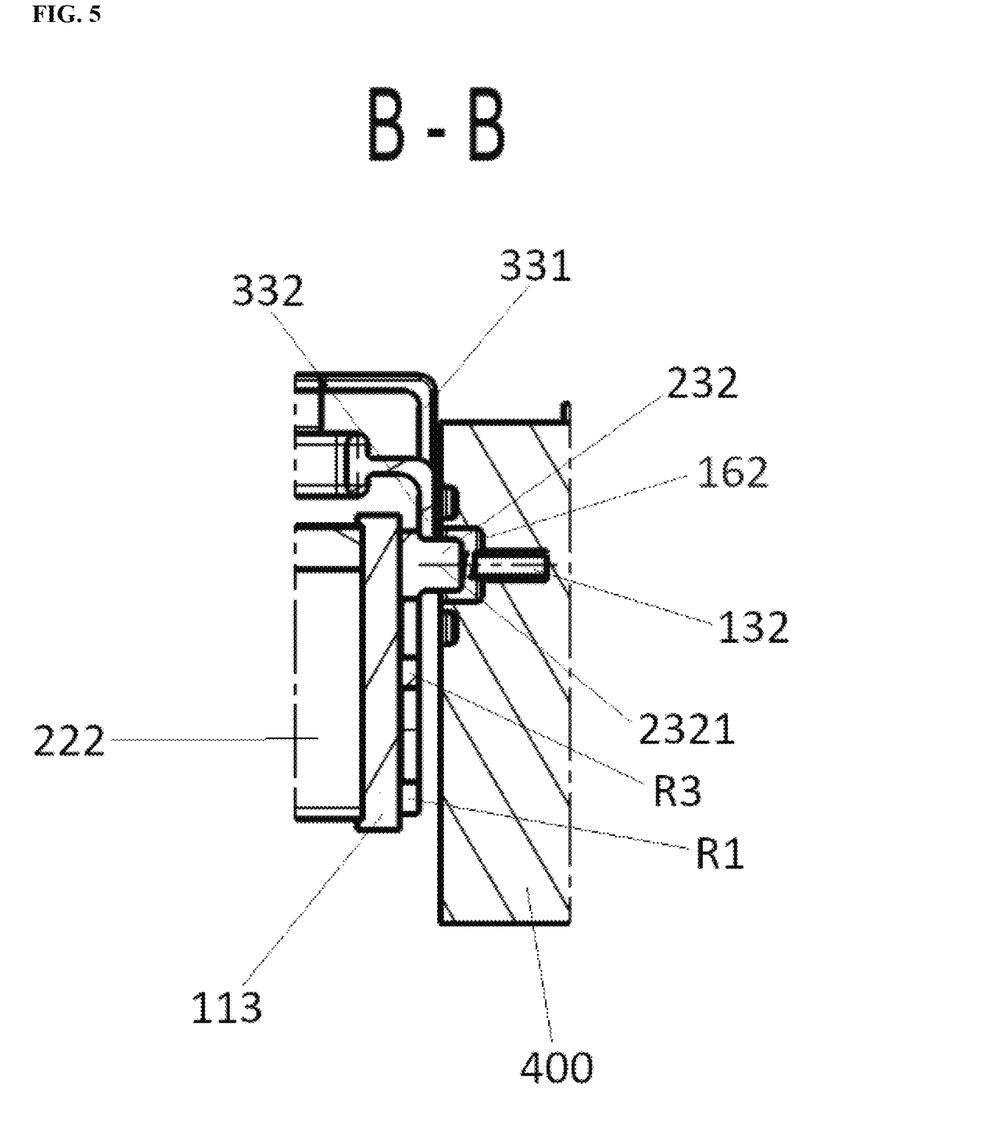
FIG. 5 shows a sectional view along the plane B-B of detail C of FIG. 3A.

FIG. 5 shows a very similar setup of the second duct terminal 132, the second filter terminal 232, and the second ionizer terminal 332. The second duct terminal 132 may be a conducting protrusion being located in a second recess 162 of the duct 100. As shown, the power source housing may provide a portion of the duct wall or may in part be unitary with at least a portion of the duct wall 110. The second recess 162 is delimited by a recess wall and the second duct terminal 132 may protrude through the bottom of the second recess wall. In an example, the second duct terminal 132 may include a conducting elastic element, e.g. a spring, that may be compressed if the second filter terminal 132 is inserted into its final location in the second recess 162 to thereby ensure a reliable electric contact between the second duct terminal 132 and the second filter terminal 232. In the final position of the second filter terminal 232, as depicted, the second filter terminal 232 may engage into the second recess 162 to thereby contact the second duct terminal 132. As can be seen in FIG. 5, the second ionizer terminal 332 may be pressed against the housing wall by a shoulder of the first filter terminal 231. Thereby, the contact between the second filter terminal 232 and the second ionizer terminal 332 is particularly good. In addition or alternatively, at least one of the second ionizer terminal 332 and the second duct terminal 132 may be a blade that cuts into the second filter terminal 232.

Figure 6:
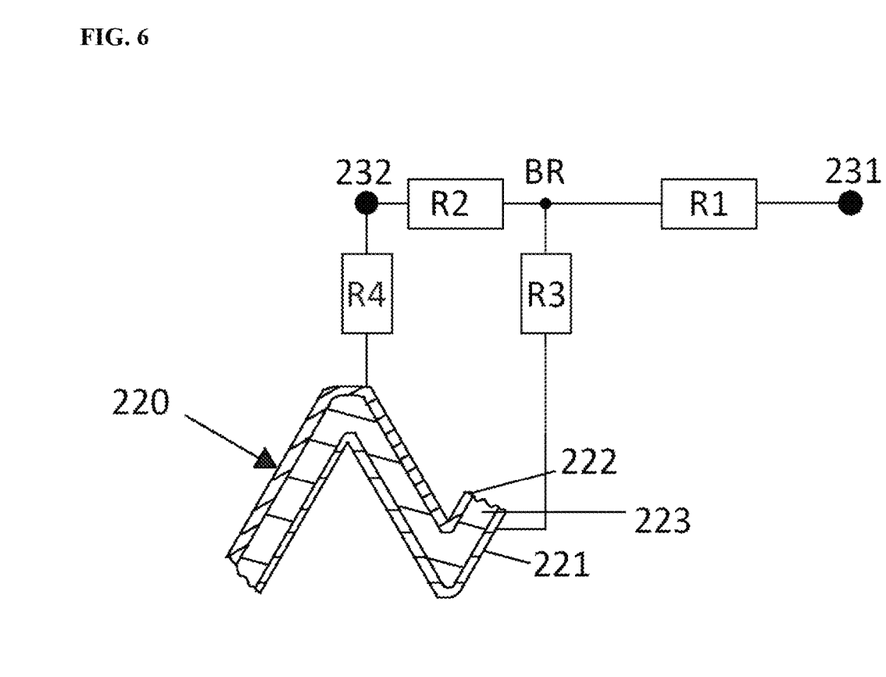
FIG. 6 shows a sketch of a filter medium and the connection of the filter elec-trodes with the corresponding terminals.

As can be seen in FIGS. 2 and 6, the filter medium 220 may include filter layers 221, 222, 223, such as one or more plied sheets, but this is only an example. Other types and shapes of filter media 220 may be used as well. The filter medium 220 may preferably include at least three layers: two polarizing electrode layers 221, 222 and a dielectric layer 223 in between of the electrode layers 221, 222. Each of the polarizing electrode layers 221, 222 may thus be considered as an electrode 221, 222 of a capacitor 220, wherein the dielectric layer 223 is the capacitor's dielectric 223 in between of the two polarizing electrodes 221, 222 (FIG. 6). The filter medium 220 may thus be and/or include and/or form a capacitor.

It will be appreciated to those skilled in the art having the benefit of this disclosure that this invention is believed to provide a gas cleaning device and a corresponding assembly method. Further modifications and alternative embodiments of various aspects of the invention will be apparent to those skilled in the art in view of this description. Accordingly, this description is to be construed as illustrative only and is provided for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 1 gas cleaning device
2 flow direction
3 upstream facing side/upstream facing end surface 3
4 downstream facing side/downstream, facing end surface
100 duct/gas filter housing
110 duct wall/housing wall
111 front side wall/front wall
112 side wall
113 rear side wall/rear wall
131 first duct terminal/protrusion (optional)
132 second duct terminal/protrusion (optional)
161 first recess (optional)
162 second recess (optional)
200 filter cartridge
220 filter medium/capacitor (optional)
221 first polarizing electrode/first conductive filter layer
222 second polarizing electrode/second conductive filter layer
223 dielectric medium (optional)
231 first filter terminal/first pin (optional)
2311 first terminal axis
232 second filter terminal/second pin (optional)
2311 second terminal axis
240 electrical module (optional)
300 gas ionizer (optional)
321 first ionizer electrode (optional)
322 second ionizer electrode (optional)
331 first ionizer terminal (optional)
332 second ionizer terminal (optional)
400 power source/high voltage source
R1 resistance/(resistor, resistive component) between the branching point BR and the first filter terminal 231
R2 resistance/(resistor, resistive component) between the branching point BR and the second filter terminal 232.
R3 resistance/(resistor, resistive component) between the branching point BR and the first polarizing electrode 221
R4 resistance/(resistor, resistive component) between the branching point BR and the second polarizing electrode 222
BR branching point

The invention claimed is:

1. A gas cleaning device comprising:
a filter cartridge with a filter medium and a first filter terminal,
a duct comprising:
a duct wall enclosing a duct volume with an upstream gas inlet and a downstream gas outlet,
a filter support, wherein the filter support removably supports the filter cartridge in the duct volume in between the upstream gas inlet and the downstream gas outlet,
a first duct terminal,
a gas ionizer that includes at least a first ionizer electrode and a second ionizer electrode, a first ionizer terminal and a second ionizer terminal, wherein first ionizer terminal is electrically connected to the first ionizer electrode and the second ionizer terminal is electrically connected to the second ionizer electrode,
wherein:
(i) the filter cartridge has an inserted position and, when the filter cartridge is in the inserted position, the first duct terminal contacts the first filter terminal, and the first ionizer terminal is electrically connected with the first duct terminal via the at least the first filter terminal, and
(ii) the filter cartridge has a non-inserted position and, when the filter cartridge is in the non-inserted position, the first duct terminal does not contact the at least the first filter terminal, and the first ionizer terminal is electrically disconnected from the first duct terminal.

2. The gas cleaning device of claim 1, wherein the filter cartridge further comprises a first polarization electrode, a second polarization electrode, and a second filter terminal, wherein the first filter terminal is electrically connected with the first polarization electrode and the second filter terminal is electrically connected with the second polarization electrode and, if the filter cartridge is inserted in the filter support, the second filter terminal contacts a second duct terminal of the duct.

3. The gas cleaning device of claim 2, wherein the first filter terminal is electrically connected via a first resistive component to a branching point, the second filter terminal is electrically connected via a second resistive component to the branching point, the first polarization electrode is electrically connected to the branching point, and the second polarization electrode is electrically connected to the second filter terminal.

4. The gas cleaning device of claim 1, wherein the first filter terminal comprises a conducting polymer and/or a conducting ceramic and/or a conducting compound.

5. The gas cleaning device of claim 3, wherein at least one of the first filter terminal, the first resistive component, the second filter terminal, the second resistance, and the branching point is unitary.

6. The gas cleaning device of claim 2, wherein the second filter terminal comprises a conducting polymer and/or a conducting ceramic and/or a conducting compound.

7. The gas cleaning device of claim 1, wherein a first surface section of the first filter terminal electrically contacts the first duct terminal and wherein a second surface section of the first filter terminal electrically contacts the first ionizer terminal.

8. The gas cleaning device of claim 2, wherein a first surface section of the second filter terminal electrically contacts the second duct terminal and wherein a second surface section of the second filter terminal electrically contacts the second ionizer terminal.

9. The gas cleaning device of claim 2, wherein:
at least one of the first filter terminal, the second filter terminal, the first duct terminal, and the second duct terminal is an electrically conducting pin and/or comprises the electrically conducting pin, wherein the electrically conducting pin of such terminal is in contact with a respectively corresponding mating terminal of the first filter terminal, the second filter terminal, the first duct terminal, and the second duct terminal,
the electrically conducting pin of the at least one of the first filter terminal, the second filter terminal, the first duct terminal, and the second duct terminal is accommodated by a recess of a respectively corresponding mating terminal,
the recess is delimited by a non-conducting recess wall, and
the respectively corresponding mating terminal of the at least one of the first filter terminal, the second filer terminal, the first duct terminal, and the second duct terminal contacts the electrically conducting pin inside of the recess.

10. The gas cleaning device of claim 9, wherein the electrically conducting pin is comprised by the filter cartridge and contacted inside a first recess to the first duct terminal and wherein:
the first duct terminal and the first ionizer terminal are separated by a first distance, and/or
the first duct terminal and the filter cartridge facing an edge of the recess wall are separated by a second distance;
wherein the first distance and/or the second distance is greater than a distance between the first ionizer electrode and the second ionizer electrode.

11. The gas cleaning device of claim 1, wherein the first filter terminal has a first sprue and wherein the first sprue contacts the first duct terminal.

12. The gas cleaning device of claim 2, wherein the second filter terminal has a second sprue and wherein the second sprue contacts the second duct terminal.

13. The gas cleaning device of claim 1, wherein a high voltage source with a first source terminal and with a second source terminal is attached to the duct, wherein the first source terminal is electrically connected to and/or coincides with the first duct terminal.

14. The gas cleaning device of claim 2, wherein the first duct terminal and/or second duct terminal and/or the first ionizer terminal first and/or the second ionizer terminal is configured as a blade that is inserted into the first filter terminal and/or the second filter terminal, respectively, to thereby provide an electrical contact of the first duct terminal and/or second duct terminal and/or the first ionizer terminal and/or the second ionizer terminal, respectively, with a core material of the first filter terminal and/or the second filter terminal.

15. The gas cleaning device of claim 1, wherein the gas ionizer is located on an upstream side of the filter cartridge.

16. A method for assembling the gas cleaning device of claim 1, the method comprising: electrically connecting the first filter terminal to the first duct terminal by inserting the filter cartridge into the filter support, wherein the first filter terminal is electrically connected to the first duct terminal and at the same time connected to the first ionizer terminal.

17. The gas cleaning device of claim 13, wherein the duct includes a second duct terminal and the second source terminal is electrically connected to or coincides with the second duct terminal.

* * * * *

UNITED STATES PATENT AND TRADEMARK OFFICE
CERTIFICATE OF CORRECTION

| | | |
|---|---|---|
| PATENT NO. | : 12,358,003 B2 | Page 1 of 1 |
| APPLICATION NO. | : 18/807286 | |
| DATED | : July 15, 2025 | |
| INVENTOR(S) | : Robert et al. | |

It is certified that error appears in the above-identified patent and that said Letters Patent is hereby corrected as shown below:

In the Claims

Claim 1, Line 35, Column 14, "wherein first ionizer" should be --wherein the first ionizer--

Claim 1, Line 44, Column 14, "the at least the first filter" should be --the first filter--

Claim 1, Line 48, Column 14, "does not contact the at least the" should be --does not contact the--

Signed and Sealed this
Eleventh Day of November, 2025

John A. Squires
*Director of the United States Patent and Trademark Office*